Figure 1:
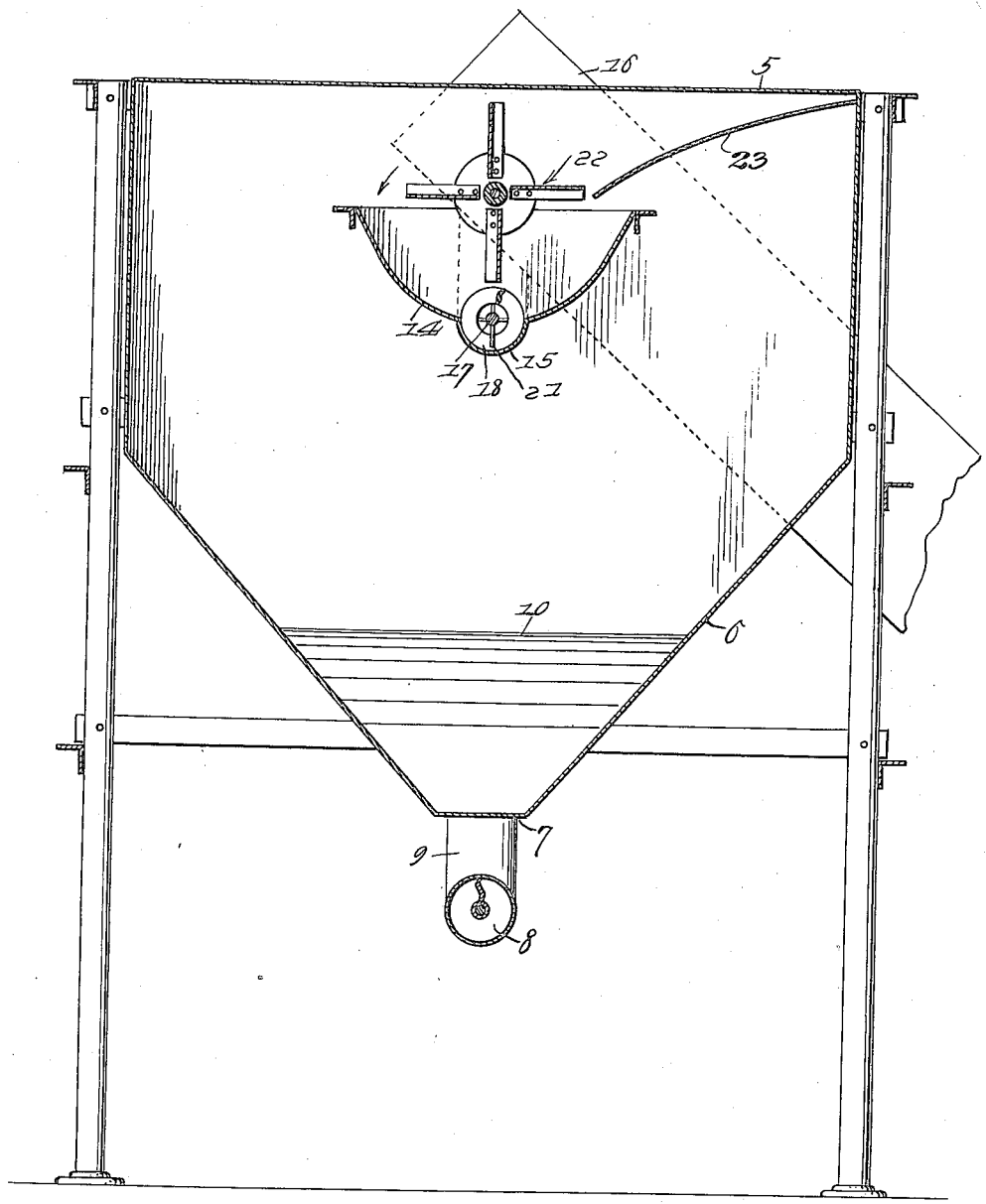

Patented Dec. 18, 1923.

1,478,205

UNITED STATES PATENT OFFICE.

WILLIAM H. DAVIS, OF CHARLESTON, WEST VIRGINIA.

METHOD OF AND APPARATUS FOR COLLECTING LIGHT PRODUCTS.

Application filed November 29, 1921. Serial No. 518,682.

*To all whom it may concern:*

Be it known that I, WILLIAM H. DAVIS, a citizen of the United States of America, and resident of Charleston, in the county of Kanawha and State of West Virginia, have invented certain new and useful Improvements in Methods of and Apparatus for Collecting Light Products, of which the following is a specification.

This invention relates to separators, and particularly to a device for separating light products from heavier materials by agitation while being conveyed through an apparatus and for collecting the light products; the said invention relating more particularly to an apparatus designed for separating and collecting light products in the nature of carbon black which, as well known, is but slightly heavier than the atmosphere and will, to a great extent, remain in suspension for a long period if the atmosphere has any perceptible motion.

It is an object of this invention, therefore, to provide an apparatus in which the light products are separated from the heavier materials and caused to travel to a collecting chamber into which the products will slowly gravitate, and from which they can be collected or transferred to suitable bins, containers or the like.

It is a further object of this invention to produce an apparatus which will convey the material through a casing or chamber and effect the separation of the products from the heavier materials and discharge the heavier materials while the products are being collected. Thus far, the terms "products" and "materials" have been employed, and it is believed apparent that by the term "products" reference is made to the reclaimed light elements such as carbon black whereas the term "materials" refers to the untreated mass that is introduced into the apparatus and the tailings that are discharged after the carbon black has been separated from it. These definitions of the terms will aid in an understanding of the further disclosure of the invention.

It is a further object of this invention to produce an apparatus having the conveying and separating means above mentioned, associated with an air circulating means effective to gently stir or waft the air in the upper part of the chamber, so that the products which have been separated from the material will be carried free of the conveyer and separator into a zone of the chamber in which the air is motionless or practically so, in order that the said products will gravitate to the bottom of the said chamber, and the said apparatus preferably has a baffle plate or apron which will prevent the said products from rising after they have passed beyond the zone of the conveyer and separator.

In the interests of producing a practical, efficient apparatus it is a further object to provide means whereby the products may be discharged from the apparatus.

In carrying the invention into practice and as illustrating one embodiment thereof, reference will be had to the accompanying drawings, in which—

Figure 2:
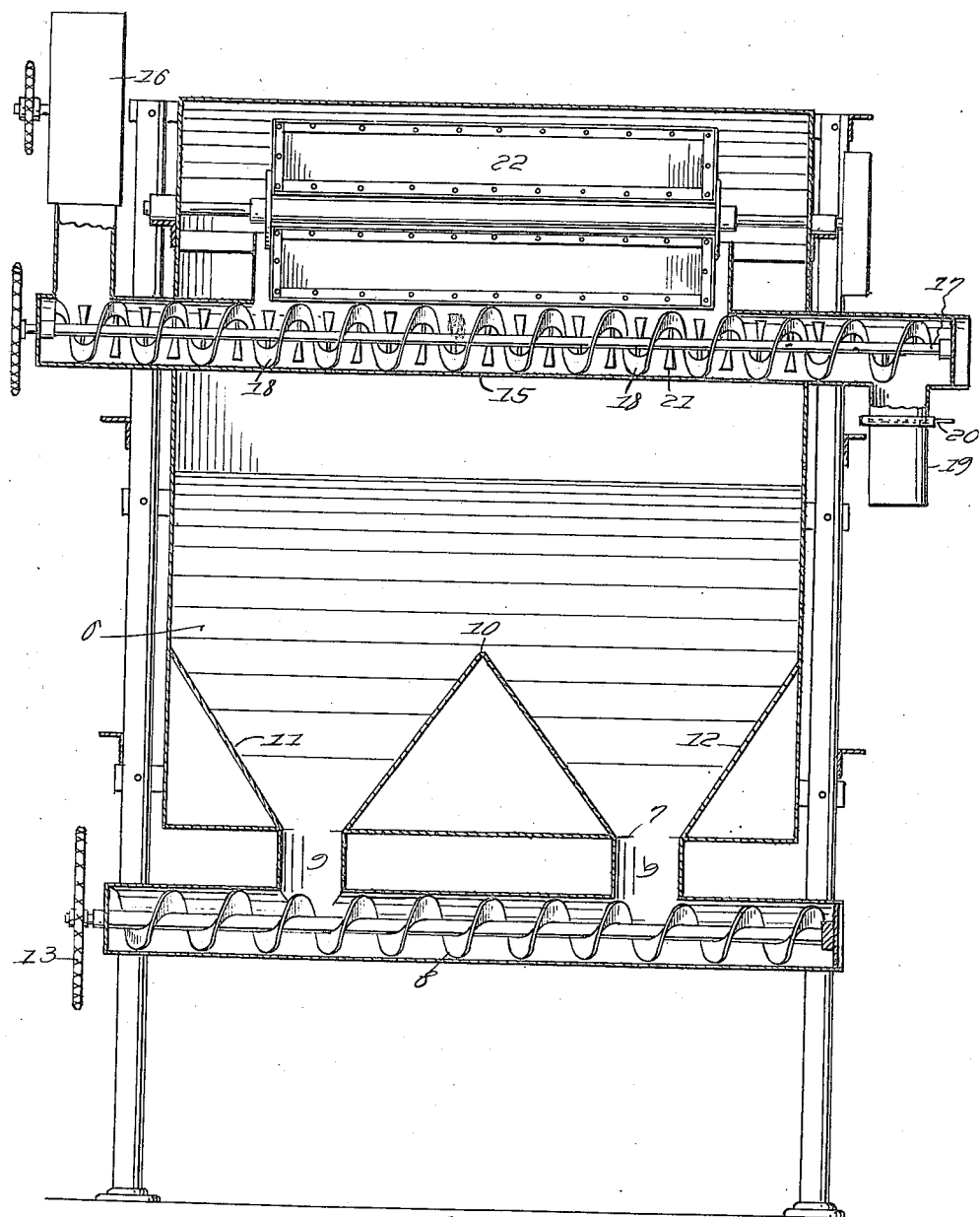

Figure 1 illustrates a vertical sectional view of an apparatus embodying the invention; and Figure 2 illustrates a sectional view at right angles to that shown in Figure 1.

In these drawings 5 denotes a casing having preferably straight sides and converging extensions 6 terminating at the floor or bottom 7. A conveyer 8 has communication with the interior of the casing through the chutes or pipes 9, and the bottom of the casing at the center is oppositely pitched as shown at 10 to cause the products to gravitate to the conveyer. The said bottom also has inclined surfaces 11 and 12 which further aid in directing the products to the conveyer. The conveyer is of conventional type and may be driven through the element 13, here shown as a sprocket wheel, which may be coupled to any source of power. The casing has a pan 14 supported in it in any appropriate way, and the central portion of the said pan is shaped to form what might be termed a trough 15 to which the material to be treated is delivered by a closed conveyer 16, it being the purpose of the inventor that the casing should be closed against the access of air thereto, except as air reaches it through the conveyer, and that is not of a character to disturb the air in the said casing. The trough portion of the pan extends beyond the sides of the casing and the conveyer 16 communicates with it at one end.

A shaft 17 is journaled in the trough and a ribbon conveyer blade 18 is connected to it in any appropriate way, and when the shaft rotates, the conveyer blade will carry material from the conveyer through the trough to a discharge spout 19, the said spout being supplied with an appropriate valve 20 which may be opened or closed as the device is being used. As the material is being conveyed longitudinally of the trough, it is desirable to agitate the material laterally of the trough and to raise it and then release it so that the heavier material will fall back into the trough and the products will be wafted by the operation of a fan, as will presently appear. To this end, the conveyer is supplied with paddles or blades 21 which radiate from the shaft 17.

A fan 22 is mounted to rotate above the pan and it is intended that this fan rotate very slowly, and in practice it has been found that 140 R. P. M. produces satisfactory results.

It is shown in the drawing and preferably this arrangement is employed in practice, that the edges of the fan blades closely approach the conveyer blade 18 in order that the air agitated by the fan will affect the products released from the material by the paddles and cause the said products to rise with the air, so that it will be carried clear of the pan. In order that the air in the lower part of the chamber shall remain practically motionless and that the products shall be carried to a zone within the chamber where the circulation of air will not interfere with the gravitation of the products, an apron or baffle 23 has its outer end anchored in appropriate way at or near the wall of the casing, and the said apron is preferably convex and has its inner end terminating over the trough in proximity to the upper edge of the said trough; hence a restricted opening is formed between the edge of the apron and the edge of the trough, through which the slightly agitated air and products may pass, as shown by the arrows in Figure 1. The said products passing with the air against the under surface of the apron will be deflected and started on its descent into that portion of the casing in which the air is wholly or practically wholly motionless, wherein it will gravitate rather rapidly and wherein it will be collected, as heretofore stated, and then find its way to the conveyer 8.

By reason of the fact that the casing is wholly enclosed against the access of air, except for that which would enter through the conveyer 16, the air within the lower part of the casing is dead or motionless, to all practical purposes of the method described for separating products from materials.

Of course there would perhaps be some motion to the upper strata of air, due to the motion of the fan, but it is not such as to adversely disturb the air under the apron and on that side of the casing protected by the apron.

As the functions and operations of the elements and their relation to other elements has been described in connection with a description of the said elements, a resumé of the operation of the apparatus is believed unnecessary to an understanding thereof by one skilled in the art.

I claim:

1. A gravity separator having a closed casing having a zone adapted to contain substantially motionless air, means for agitating air at the top of the casing, and substantially airtight means for delivering products slightly heavier than air to the zone of the casing in which the air is agitated.

2. A separator comprising a casing having a closed chamber, an air space therein in which the air is substantially practically motionless, substantially airtight means for introducing material having products slightly heavier than air to the chamber near the top thereof, means for separating the products from the material, and means for gently agitating the air in which the products are separated from the material.

3. A separator comprising a casing having a closed chamber, an air space therein in which the air is substantially practically motionless, substantially airtight means for introducing material having products slightly heavier than air to the chamber near the top thereof, means for separating the products from the material, means for gently agitating the air in which the products are separated from the material, and an apron in the chamber under which the said products are delivered by the agitated air.

4. In a separator, a casing having an air space in which air is practically motionless, substantially airtight means for delivering material to the upper portion of the casing, and means for separating products slightly heavier than air from the material including an air current producing means within the casing near the top thereof for wafting the products away from the delivering means.

5. In a separator, a casing having its lower area forming an air space for substantially practically motionless air, a conveyer having airtight connection with and extending into the casing near the top thereof for carrying materials through the casing, means associated with the conveyer for lifting the material in its travel to free materials slightly heavier than air therefrom, and means for producing an air current in proximity to the conveying and lifting means for wafting the products from the conveyer.

6. In a separator, a casing having its lower area forming an air space for substantially practically motionless air, a conveyer having airtight connection with and extending into the casing near the top thereof for carrying materials through the casing, means associated with the conveyer for lifting the material in its travel to free materials slightly heavier than air therefrom, means for producing an air current in proximity to the conveying and lifting means for wafting the products from the conveyer, and an apron extending from the side of the casing and terminating in proximity to and above the conveyer to receive the impact of the circulated air and products and deflect the same to the air space of the chamber first mentioned.

7. In a separator, a casing having its lower area forming an air space for substantially practically motionless air, a conveyer trough having airtight connection with and extending into the casing near the top thereof, extending through the walls of the casing, means for delivering material to the conveyer exteriorly of the casing, means for discharging material from the conveyer exteriorly of the casing, and a conveyer in the trough for carrying materials through the casing, means associated with the conveyer for lifting the material in its travel to free materials slightly heavier than air therefrom, means for producing an air current in proximity to the conveying and lifting means for wafting the products from the conveyer, an apron extending from the side of the casing and terminating in proximity to and above the conveyer to receive the impact of the circulated air and products and deflect the same to the air space of the chamber first mentioned, and means for removing the products from the said chamber.

8. In a separator, a closed casing having a capacity for holding air substantially motionless near the bottom thereof, a conveyer extending through the casing near the top, the said conveyer having its receiving and discharging ends exterior of the casing, and means for gently moving the air above the conveyer for driving light products from the conveyer.

9. In a separator, a casing having a product discharging means, a conveyer trough extending through the casing near the top thereof including a pan with a trough in its center, a conveyer rotatable in the trough, means for delivering material to the trough in position to be engaged by the conveyer, means for agitating the material while being carried by the conveyer, a fan operative above the conveyer and effective to displace products slightly heavier than air from the material carried by the conveyer, and means for restricting the upward movement of the air and said products.

10. The herein described method of collecting products slightly heavier than substantially motionless air, consisting in delivering material to an enclosed casing having substantially motionless air, in separating the products from the material and in agitating the air gently at the top of the casing in which the products are separated from the material whereby the said products are suspended and carried in the casing and from which said products gravitate.

11. The herein described method of collecting products slightly heavier than air, consisting in introducing material to a closed casing having substantially motionless air, in agitating the air in proximity to the introduced material to cause a suspension of the products in the air from which it gravitates to and through the substantially motionless air.

WILLIAM H. DAVIS.